US012741871B2

(12) United States Patent
Li et al.

(10) Patent No.: US 12,741,871 B2
(45) Date of Patent: Sep. 22, 2026

(54) RESOURCE UTILIZATION METHOD OF CRUDE SODIUM SULFATE

(71) Applicant: Hunan Fortune Environmental Technology Co., LTD., Yueyang City (CN)

(72) Inventors: Yongzhan Li, Yueyang City (CN); Jihong Huang, Yueyang City (CN); Xia Liu, Yueyang City (CN); Yijun Xu, Yueyang City (CN)

(73) Assignee: Hunan Fortune Environmental Technology Co., Ltd., Yueyang City (CN)

( * ) Notice: Subject to any disclaimer, the term of this patent is extended or adjusted under 35 U.S.C. 154(b) by 937 days.

(21) Appl. No.: 18/013,381

(22) PCT Filed: Oct. 10, 2022

(86) PCT No.: PCT/CN2022/124380

§ 371 (c)(1),
(2) Date: Dec. 29, 2022

(87) PCT Pub. No.: WO2024/040703

PCT Pub. Date: Feb. 29, 2024

(65) Prior Publication Data

US 2024/0067522 A1 Feb. 29, 2024

(30) Foreign Application Priority Data

Aug. 24, 2022 (CN) ......................... 202211017891.2

(51) Int. Cl.
*C01B 17/06* (2006.01)
*C25B 1/16* (2006.01)

(52) U.S. Cl.
CPC ................ *C01B 17/06* (2013.01); *C25B 1/16* (2013.01)

(58) Field of Classification Search
None
See application file for complete search history.

(56) References Cited

U.S. PATENT DOCUMENTS 3,404,955 A * 10/1968 Grimm ............... C01B 17/7655 423/533
3,432,263 A * 3/1969 Ohsol ................ C01B 17/7655 423/529

(Continued)

FOREIGN PATENT DOCUMENTS

CN 1045082 A 9/1990
CN 101585512 A 11/2009

(Continued)

OTHER PUBLICATIONS

Gu (CN 110669560 A) Merged english translation and original (Year: 2021).*

(Continued)

*Primary Examiner* — Brian W Cohen
*Assistant Examiner* — Nathanael Jason Downes
(74) *Attorney, Agent, or Firm* — Baker Donelson; Carl M. Davis, II; Dorian B. Kennedy

(57) ABSTRACT

The present disclosure provides a resource utilization method of crude sodium sulfate. The method comprises the following step: reducing the crude sodium sulfate to form a sodium sulfide solution; making the sodium sulfide solution perform a first reaction with chlorine to obtain sulfur and a sodium chloride solution; and electrolyzing the sodium chloride solution to obtain a sodium hydroxide solution and chlorine, and supplying the generated chlorine to the sodium sulfide solution to perform the first reaction. In the above resource utilization method of crude sodium sulfate, the sodium hydroxide is generated by combining relatively simple and mature process steps, and the crude sodium sulfate containing sodium chloride and sodium sulfate can (Continued)

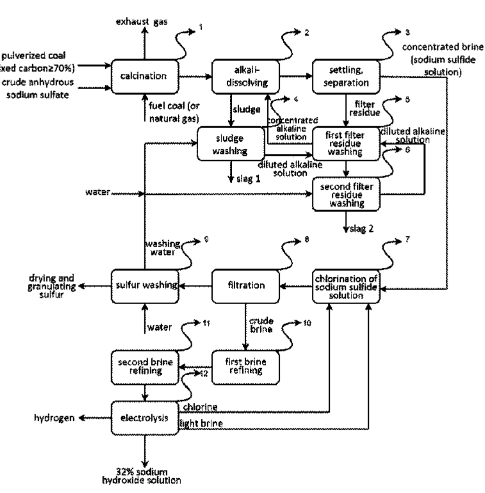

be effectively converted to the sodium hydroxide in large market demand, so that complete recycling of sodium element and sulfur element is realized, which not only can fully utilize the resources and protect the environment, but also can create great economic benefits and environmental benefits, thus having a great significance to realize the green development of relevant industries.

6 Claims, 1 Drawing Sheet

(56) References Cited

U.S. PATENT DOCUMENTS

| | | | | | |
|---|---|---|---|---|---|
| 3,536,446 | A | * | 10/1970 | Maurer | C01B 17/7655 423/535 |
| 4,290,873 | A | * | 9/1981 | Weaver | C25B 9/17 204/266 |
| 5,391,267 | A | * | 2/1995 | Zoppi | C01B 17/22 205/510 |
| 2023/0416089 | A1 | * | 12/2023 | Dijkstra | C01B 17/48 |

FOREIGN PATENT DOCUMENTS

| | | | | | |
|---|---|---|---|---|---|
| CN | 104118850 | A | | 10/2014 | |
| CN | 104445090 | A | | 3/2015 | |
| CN | 110669560 | A | * | 1/2020 | C25B 1/34 |
| CN | 112010266 | A | | 12/2020 | |
| CN | 113149038 | A | | 7/2021 | |
| CN | 114769293 | A | | 2/2022 | |
| CN | 114560446 | A | | 5/2022 | |

OTHER PUBLICATIONS

English Abstract of cited patent doucments.
PCT International Search Report, PCT/CN2022/124380, Apr. 20, 2023, 4 pages.
Notification to Grant Patent Right for Invention of priority application CN202211017891.2, dated Apr. 9, 2023, 1 page.
Office Action of priority application of CN2022110178912.1, 4 pages.
PCT, Written Opinion, International Searching Authority, PCT/CN2022/124380, Apr. 20, 2023, 4 pages.
ZHOU Chang-sheng, Study and improvement of the production process of sodium sulphide, 1995-2006 Tsinghua Tongfang Optical Disc Co., Ltd., 4 pages.
Observation of priority application of CN2022110178912.1, 6 pages.
Amended Claims of priority application of CN2022110178912.1, 3 pages.

* cited by examiner

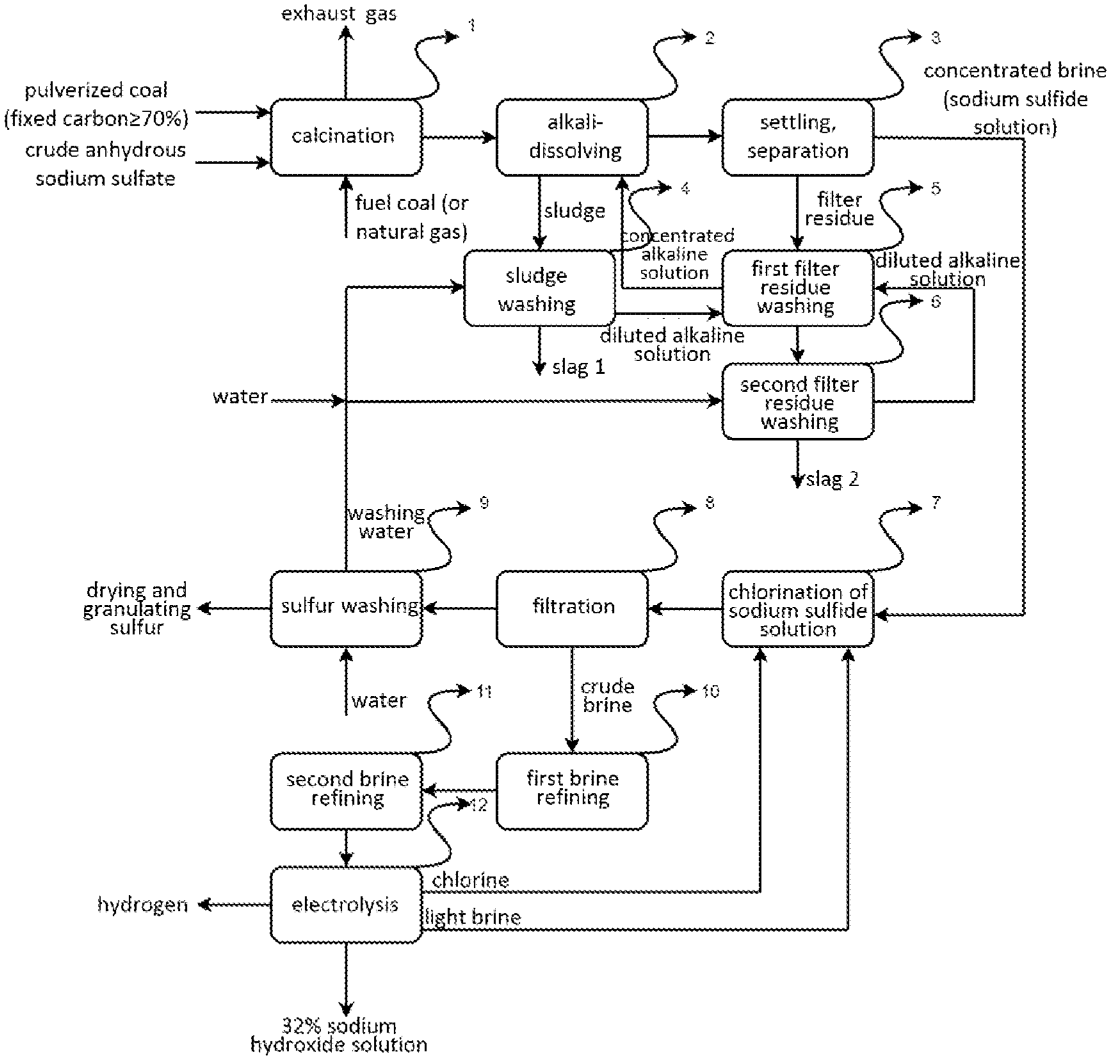

exhaust gas
1
2
3
pulverized coal (fixed carbon≥70%)
crude anhydrous sodium sulfate
calcination
alkali-dissolving
settling, separation
concentrated brine (sodium sulfide solution)
fuel coal (or natural gas)
sludge
4
concentrated alkaline solution
filter residue
5
sludge washing
first filter residue washing
diluted alkaline solution
6
diluted alkaline solution
slag 1
water
second filter residue washing
slag 2
washing water
9
8
7
drying and granulating sulfur
sulfur washing
filtration
chlorination of sodium sulfide solution
water
crude brine
11
10
second brine refining
first brine refining
12
hydrogen
electrolysis
chlorine
light brine
32% sodium hydroxide solution

RESOURCE UTILIZATION METHOD OF CRUDE SODIUM SULFATE

CROSS-REFERENCE TO RELATED APPLICATION

The present disclosure claims the priority to the Chinese patent application with the filing No. CN202211017891.2 filed with the Chinese Patent Office on Aug. 24, 2022, and entitled "Resource Utilization Method of Crude Sodium Sulfate", the contents of which are incorporated herein by reference in entirety.

TECHNICAL FIELD

The present disclosure relates to the technical field of environmental protection and treatment and utilization for solid waste, in particular to a resource utilization method of crude sodium sulfate.

BACKGROUND ART

In many production processes in chemical industry, a large amount of by-product sodium sulfate is generated. For example, in the chemical fiber industry, 0.5-0.8 tons of $Na_2SO_4$ is generated for production of each 1 ton of chemical fibers, the total output of chemical fibers in our country reaches tens of millions of tons, and the amount of by-product $Na_2SO_4$ reaches tens of millions of tons. In the booming new energy industry, for example, a ternary precursor material, which is hydroxide $Ni_xCo_yMn_{(1-x-y)}(OH)_2$ of nickel, cobalt and manganese, is generally prepared by taking sulfates of nickel, cobalt, and manganese as a raw material and sodium hydroxide and ammonia water as precipitant through reaction, and a large amount of sodium hydroxide needs to be consumed in the production process. Meanwhile, a large amount of sodium sulfate is generated in the process wastewater, a large amount of by-product sodium sulfate (anhydrous sodium sulfate) is obtained in the wastewater treatment process, and some of the by-product sodium sulfate contains sodium chloride, ammonium sulfate and other salts, and some by-product remains a small part of organic impurities and heavy metals, which cannot be directly used for downstream production, and can only be treated as solid waste, resulting in high costs and easily causing secondary pollution. Such industrial by-product sodium sulfate is collectively called as crude sodium sulfate.

At present, the treatment method of crude sodium sulfate mainly includes: safe landfill and recrystallization purification to obtain products for sale. The former occupies valuable land resources and is easy to cause soil salinization and underground water pollution; the latter requires huge equipment, consumes a lot of energy, and has a high cost, and the generated value is not enough to make up for the cost, such that great economic burden is brought to enterprises. The prepared sodium sulfate has a low additional value and limited sales market, and the process is easy to cause pollution, such that the disposal of the crude sodium sulfate becomes a difficult problem of related industries. It is of great significance to solve this difficult problem, realize the resource utilization of crude sodium sulfate, and create good economic and environmental benefits.

The related technology provides a resource utilization method of a large amount of by-product sodium sulfate in the chemical fiber industry, wherein a first step of the method is calcining sodium sulfate at high temperature and reducing sodium sulfate into sodium sulfide; a second step is dissolving the generated sodium sulfide into a solution to react with zinc oxide and generate a sodium hydroxide solution and water-insoluble zinc sulfide, and using the prepared sodium hydroxide solution for chemical fiber production; and a third step is calcining the zinc sulfide obtained in the second step to obtain zinc oxide and sulfur dioxide, further converting the sulfur dioxide to obtain sulfuric acid, and returning the zinc oxide to the first step for preparing sodium hydroxide.

However, this method mainly has the following disadvantages: this method can only process salts with sodium sulfate as a single component, but cannot process a mixed salt of sodium chloride and sodium sulfate.

SUMMARY

A main objective of the present disclosure is to provide a resource utilization method (recycling utilization method) of crude sodium sulfate, so as to solve the technical problem in the related art that only salts with sodium sulfate as a single component can be treated.

The present disclosure provides a resource utilization method of crude sodium sulfate, including steps of:

- reducing the crude sodium sulfate to form a sodium sulfide solution;
- making the sodium sulfide solution perform a first reaction with chlorine to obtain sulfur and a sodium chloride solution; and
- electrolyzing the sodium chloride solution to obtain a sodium hydroxide solution and chlorine, and supplying the generated chlorine to the sodium sulfide solution to perform the first reaction.

According to an embodiment of the present disclosure, the step of reducing the crude sodium sulfate to form a sodium sulfide solution includes:

- mixing the crude sodium sulfate and pulverized coal according to a weight ratio of 100:21~23, calcining and reducing the mixture at 800~1100° C., cooling reactant crude base melt to 700° C., crushing and then hot-dissolving the same with an alkaline solution at 75~80° C. into a liquid, making the liquid stand and filtering the same to obtain the sodium sulfide solution.

According to an embodiment of the present disclosure, the alkaline solution is a solution containing $Na_2S$, the concentration of the alkaline solution is 3%-5%, and the temperature of the alkaline solution is 20~50° C.

According to an embodiment of the present disclosure, the pulverized coal is smokeless coal, with a fixed carbon content more than 70%.

According to an embodiment of the present disclosure, in the step of making the sodium sulfide solution perform a first reaction with chlorine to obtain sulfur and a sodium chloride solution:

- the concentration of the sodium sulfide solution is 15-23%, the flow rate of the chlorine is 7 $m^3$/min~11 $m^3$/min, and the sulfur and the sodium chloride solution obtained from the first reaction are separated.

According to an embodiment of the present disclosure, the electrolytic condition of electrolyzing the sodium chloride solution is that the voltage is 5 V~15 V, and the concentration of the sodium chloride solution is 21%~26%.

According to an embodiment of the present disclosure, the method further includes: oxidizing sulfur to produce sulfuric acid.

According to an embodiment of the present disclosure, the step of oxidizing sulfur to produce sulfuric acid includes:

melting the sulfur, and burning the molten sulfur under conditions of a pressure of 3.5~4.5 MPa and a temperature of 800~1000° C. to generate smoke; and compressing the smoke, cooling the same to 140~150° C., adjusting the pressure to 7.3~8.6 MPa, and making the smoke react with water to obtain the sulfuric acid.

In the above resource utilization method of crude sodium sulfate, the sodium hydroxide is generated by combining relatively simple and mature process steps, and the crude sodium sulfate containing sodium chloride and sodium sulfate can be effectively converted to the sodium hydroxide in large market demand, such that complete recycling of sodium element and sulfur element is realized, which not only can fully utilize the resources and protect the environment, but also can create great economic benefits and environmental benefits, thus having a great significance to realize the green development of relevant industries.

BRIEF DESCRIPTION OF DRAWINGS

In order to more clearly illustrate the technical solutions in embodiments and examples of the present disclosure or in the prior art, the accompanying drawing which needs to be used in the description of the embodiments, the examples or the prior art will be introduced briefly below, and apparently, the accompanying drawing in the description below merely shows some examples of the present disclosure, and those ordinarily skilled in the art still could obtain other accompanying drawings in light of the structure shown in the accompanying drawing without any creative effort.

FIG. 1 is a schematic diagram of process flow of a resource utilization method of crude sodium sulfate in an embodiment of the present disclosure.

DETAILED DESCRIPTION OF EMBODIMENTS

The technical solutions in the embodiments of the present disclosure will be described clearly and completely below in conjunction with the accompanying drawing in the embodiments of the present disclosure, and apparently, some but not all embodiments of the present disclosure are described. Based on the embodiments in the present disclosure, all of other embodiments obtained by a person ordinarily skilled in the art without using creative efforts shall fall within the scope of protection of the present disclosure.

An embodiment of the present disclosure discloses a resource utilization method of crude sodium sulfate, including steps of:

S100: reducing the crude sodium sulfate to form a sodium sulfide solution.

In some embodiments, the step of reducing the crude sodium sulfate to form a sodium sulfide solution includes:

mixing the crude sodium sulfate and pulverized coal according to a weight ratio of 100:21~23, calcining and reducing the mixture at 800~1100° C., cooling the reactant crude base melt to 700° C., crushing and then hot-dissolving the same with an alkaline solution at 75~80° C. into a liquid, making the liquid stand and filtering the same to obtain the sodium sulfide solution.

Optionally, the crude sodium sulfate and the pulverized coal are calcined and reduced to form the sodium sulfide solution. In the above, the pulverized coal is smokeless coal, with a fixed carbon content more than 70%, preferably more than 80%. The calcination and reduction of sodium sulfate contain a calcination procedure, an alkali-dissolving procedure, a settling and separation procedure, a first- and second-stage slag washing procedure, etc.

Main equipment in the calcination procedure is a converter. Anhydrous crude sodium sulfate is formulated and evenly mixed according to a mass ratio of 19~25% of the pulverized coal to pure sodium sulfate, and continuously fed into the converter from a burner by using an automatic feeder, natural gas is injected into a furnace from a furnace tail in a counter-current manner for combustion, and the materials in the converter are heated to 1050-1100° C. and calcined and reduced into a crude base hot melt. A main chemical reaction is as follows:

$$Na_2SO_4+2C=Na_2S+2CO_2 \quad (1)$$

The crude base hot melt is continuously discharged from the furnace tail, naturally cooled to about 700° C., smashed by an alkali smashing machine into fragments, which are sent to a hot-molten tank for the alkali-dissolving procedure and leached with an alkaline solution (i.e., a solution containing $Na_2S$, such as an aqueous solution containing $Na_2S$) for slag washing, a concentrated alkali containing $Na_2S$ with a mass fraction of 15%-23% produced by hot dissolving enters the settling and separation procedure, and after natural settling, a supernatant liquid is concentrated brine (sodium sulfide solution) and is sent to a chlorination procedure.

Waste slags are produced during the calcination and reduction of sodium sulfate, and the waste slags include sludge produced in the alkali-dissolving procedure and filter residues produced in the settling and separation procedure. The sludge undergoes a sludge washing procedure to obtain waste slags 1. The filter residues are subjected to first filter residue washing and second filter residue washing to obtain waste slags 2. The waste slags 1 and the waste slags 2 are water-washed until the sodium sulfide content is lower than 1%, and they are sent out as brick-making materials after neutralization treatment.

S200: making the sodium sulfide solution perform a first reaction with chlorine to obtain sulfur and a sodium chloride solution.

In some embodiments, in the step of making the sodium sulfide solution perform a first reaction with chlorine to obtain sulfur and a sodium chloride solution:

the concentration of the sodium sulfide solution is 15-23%, the flow rate of the chlorine is 7~11 $m^3$/min, and the sulfur and the sodium chloride solution obtained from the first reaction are separated.

Optionally, the 15%~23% sodium sulfide solution is fed into a chlorination reactor, and chlorine is introduced into the reactor for chlorination. By adjusting the flow rate of chlorine and cooling the cooling water, the reaction temperature is controlled to be 60-80° C., the reaction pressure is a normal pressure, the flow rate of chlorine is 7 $m^3$/min-11 $m^3$/min, the reaction time is about 2 hours, and pH at reaction end point is 7.0. The chemical reaction is as follows:

$$Na_2S+Cl_2=2NaCl+S \quad (2)$$

After the reaction is terminated, stirring continues for 30 minutes, the reactant is vacuum-filtered; filter residues are fine granular sulfur, and a filtrate is a crude sodium chloride solution.

The fine granular sulfur is water-washed until $Cl^-$ is qualified through $AgNO_3$ detection, and then dried, melted, and granulated to obtain finished product sulfur. The finished product sulfur may be sold or used for acid production. The washing water can be returned to one or more procedures of sludge washing, first filter residue washing, and second filter residue washing of S100.

The filtrate is just a crude sodium chloride solution, which contains 21%-26% of sodium chloride, has various indexes meeting the requirements of the crude brine for electrolysis, and is sent to the electrolysis procedure.

S300: electrolyzing the sodium chloride solution to obtain a sodium hydroxide solution and chlorine, and supplying the generated chlorine to the sodium sulfide solution to perform the first reaction.

The electrolytic condition of electrolyzing the sodium chloride solution is that the voltage is 5 V~15 V; and the concentration of the sodium chloride solution is 21%~26%.

Optionally, the crude sodium chloride solution prepared in S200 step is crude brine, in which $Ca^{2+}$, $Mg^{2+}$, and $SO_4^{2-}$ ions, free chlorine, and suspended matters are contained. Electrolysis requirements can be met through two times of refining. First refining is firstly adding 10% $Na_2SO_3$ to remove free chlorine, and then sequentially adding refining agents $Na_2CO_3$, NaOH, and $BaCl_2$, respectively, so that $Ca^{2+}$, $Mg^{2+}$, and $SO_4^{2-}$ ions in the brine generate $CaCO_3$, $Mg(OH)_2$ and $BaSO_4$ precipitates, which are separated out in sequence, and introducing the clarified solution having undergone membrane filtration into second brine refining. The main processing equipment thereof is a chelate resin tower, and a three-tower-type flow is adopted, wherein the operation and regeneration treatments of the tower and periodic switching program control thereof are realized by a procedure controller PLC. The refined brine is pumped into a high-level tank, heated to 65-85° C. and then injected into an electrolytic cell. The refined brine is electrolyzed under the action of direct current to produce chlorine, hydrogen, and 32% caustic soda. The electrolytic reaction is as follows:

$$2NaCl+2H_2O=2NaOH+H_2+Cl_2 \quad (3)$$

The chlorine is returned to S200 for chlorination of the sodium sulfide solution, light brine produced by the electrolytic cell is returned to the chlorination procedure, and is mixed with the sodium sulfide solution to form a mixed solution before the chlorination. The brine after the chlorination has the concentration of 21%~26%, and the baume degree of 23~24.

In some embodiments, the method further includes:

S400: oxidizing sulfur to produce sulfuric acid.

The step of oxidizing sulfur to produce sulfuric acid includes:

S401: melting the sulfur, and burning the molten sulfur under conditions of a pressure of 3.5~4.5 MPa and a temperature of 800~1000° C. to generate smoke; and

S402: compressing the smoke, cooling the same to 140~150° C., adjusting the pressure to 7.3~8.6 MPa, and making the smoke react with water to obtain the sulfuric acid.

Optionally, sulfur is melted into a liquid state, refined liquid sulfur can be prepared by a blade-type liquid sulfur filter, then injected into a sulfur furnace by an atomizing sulfur gun, and burnt under the conditions of a pressure of 3.5~4.5 MPa and a temperature of 800~1000° C., so as to generate smoke. In this process, the refined liquid sulfur firstly reacts with oxygen to generate $SO_2$, and the $SO_2$ is further oxidized under the effect of high pressure and high temperature to generate $SO_3$. That is, the main component in the smoke is $SO_3$. $SO_3$ reacts with water to generate sulfuric acid.

In the above resource utilization method of crude sodium sulfate, the sodium hydroxide is generated by combining relatively simple and mature process steps, and the crude sodium sulfate containing sodium chloride and sodium sulfate can be effectively converted to the sodium hydroxide in large market demand, such that complete recycling of sodium element and sulfur element is realized, which not only can fully utilize the resources and protect the environment, but also can create great economic benefits and environmental benefits, thus having a great significance to realize the green development of relevant industries.

However, in the resource utilization method of a large amount of by-product sodium sulfate in the related art such as the chemical fiber industry, in addition to the shortcoming that this method can only treat salt with sodium sulfate as a single component, but cannot treat mixed salt of sodium chloride and sodium sulfate, this method has the following disadvantages: 1. the sodium hydroxide solution produced by this method contains a certain amount of Zn (generally present in the form of $ZnO_2^{2-}$), there is no problem with the sodium hydroxide solution for the production of chemical fiber, because $ZnSO_4$ should be added during the production of chemical fiber, but it is obviously not suitable for other industries; 2. this method is realized through cyclic conversion of zinc oxide with the zinc oxide as an intermediate material, while the zinc oxide has a relatively high value, and is lost in the cyclic conversion process, thus, on the one hand, the costs will be increased, and on the other hand, most of the lost zinc is discharged in the form of dust, and will cause pollution to atmosphere and surface water.

Compared with the prior art, the present disclosure has the following beneficial effects.

1. The crude sodium sulfate of the present disclosure can be understood as a sodium sulfate mixture, i.e., the crude sodium sulfate includes sodium sulfate and other impurities, wherein the content of sodium sulfate is relatively high. The crude sodium sulfate may be mirabilite, anhydrous sodium sulfate, and by-product sodium sulfate, etc. The crude sodium sulfate typically contains a certain amount of sodium chloride, ammonium chloride, and ammonium sulfate.

In some conventional resource utilization methods of crude sodium sulfate, sodium chloride and other salts may interfere with the progress of a part of the reaction, and affect the final product, therefore, the crude sodium sulfate needs to be pre-treated, to separate sodium chloride and other salts in advance. Such separation is relatively difficult, for example, the separation needs to be performed through a specific permeable membrane, and the separation efficiency is relatively low, so that the efficiency of the resource utilization method of the crude sodium sulfate is relatively low, resulting in relatively high final costs. Obviously, for the crude sodium sulfate used in the present disclosure, sodium chloride and sodium sulfate do not need to be separated in advance (because sodium chloride is the target product of the next step S200). For crude sodium sulfate containing ammonium sulfate or ammonium chloride, a corresponding amount of sodium carbonate is mixed during the calcination for calcining together, and then ammonia in the exhaust gas is recovered. In this way, the procedures are saved, and the production costs are reduced.

2. The sodium sulfide solution is chlorinated by using chlorine generated in the electrolysis. In this way, the electrolysis byproduct chlorine is comprehensively used, thus avoiding the problem of limited production caused by imbalance of chlorine consumption in the chlorine-alkali industry, so that the production of sodium hydroxide is not restricted by the unsalable chlorine.

3. The chlorination of sodium sulfide produces sulfur. The sulfur can be sold directly. If the sulfuric acid is used on site, the sodium sulfide also can be made into sulfuric acid for on-site production.

4. The hydrogen produced by the electrolysis can be used as a clean energy source, and also can be used as a hydrogen source of hydrogenation products, such as production of hydrogen peroxide.

EXAMPLES

Example 1

Calcination and reduction: as shown in FIG. 1, a calcination and reduction system includes calcination 1, alkali-dissolving 2, settling and separation 3, sludge washing 4, first filter residue washing 5, and second filter residue washing 6. 100 g of chemical fiber by-product, anhydrous mirabilite, (containing 95% of sodium sulfate) and 23 g of white coal with a fixed carbon content of 70% were mixed and ground to 200 mesh, the resultant was then placed in a 200 ml corundum crucible, then the corundum crucible was placed in an atmosphere-protective high-temperature reaction furnace, tail gas of the reaction furnace was discharged after being led into a liquid-alkali absorption bottle and absorbing acid gas, $N_2$ was first introduced into the reaction furnace for about 10 minutes, to replace air in the furnace, $N_2$ was introduced continuously, and the temperature started to be raised. When the temperature was raised to 920° C., bubbles in the absorption bottle increased suddenly, then the reaction started. With continued heating, the bubbles increased violently. After about 10 minutes, the bubbles decreased. When the furnace temperature was raised to 1050° C., the bubbles were stable (substantially $N_2$). At this time, the reaction substantially ended. The temperature continued to be raised to 1150° C. and the temperature was maintained for 30 minutes, then the heating was stopped, the reaction of calcination 1 was completed, and the reaction took about 60 minutes. $N_2$ continued to be introduced, and the resultant was cooled to 250° C. or lower under the protection of $N_2$. Furnace door was opened, the crucible was taken out, the materials in the crucible were transferred to 180 ml of 75° C. hot water, and stirred at 75° C. to leach for 6 hours, and then the alkali-dissolving 2 was completed. The resultant was filtered to obtain a sodium sulfide solution, filter cake was washed twice with tap water, 10 ml of water each time, and the washing water was incorporated into the sodium sulfide solution (these operations are equivalent to settling and separation 3, sludge washing 4, first filter residue washing 5, and second filter residue washing 6), to obtain 241.7 g of sodium sulfide solution. According to analysis, the content of sodium sulfide is 20.2%, and the sodium sulfide yield is 93.56%.

Chlorination of sodium sulfide: as shown in FIG. 1, the chlorination system contains chlorination 7 for sodium sulfide solution, filtration 8, and sulfur washing 9. 200 g of the sodium sulfide solution prepared above was added to a 250 ml agitating high-pressure reaction kettle made of stainless steel. The high-pressure kettle is equipped with a pressure gauge, a thermometer, a pH meter, a chlorine inlet, and a tail gas outlet. A chlorine pipeline and the pH meter were inserted below a liquid level, and agitation was started. At this time, temperature in the kettle was 28° C., pH was greater than 14 (pH>14). The chlorine was slowly introduced to maintain a slight positive pressure in the kettle. The sodium sulfide solution reacted with chlorine, the pH value of the solution started to decrease, and temperature of the materials in the kettle slowly rose. When the pH was 7 (pH=7), the chlorine supply was stopped, at which time the temperature was 43° C., and the chlorine supply lasted for 45 minutes. Agitation continued for 30 minutes, the chlorination 7 for sodium sulfide solution was completed. The high-pressure kettle was opened, the materials were poured into a 500 ml beaker, then suction filtration was performed, the materials in the high-pressure kettle were washed by a filtrate into the above beaker, and then the washed materials were poured into a Buchner funnel for filtration. The filter cake was washed twice with clean water, 10 ml of water each time, and the washing water was introduced into the filtrate. The filter cake, being fine granular sulfur, was dried at 100° C. and then had a weight of 16.8 g, the sulfur recovery was 94.2%, the filtrate as the crude sodium chloride solution had a weight of 236 g, in which the sodium chloride content was 25.23%, and 0.23% of sodium sulfate was contained. The sodium chloride yield was 98.25%.

Electrolysis for sodium chloride solution: the crude sodium chloride solution prepared above, which was crude brine, was taken, containing $Ca^{2+}$, $Mg^{2+}$, and $SO_4^{2-}$ ions, free chlorine, and suspended matters, and could satisfy the electrolytic requirement after two times of refining. First refining was firstly adding 10% $Na_2SO_3$ to remove free chlorine, and then adding refining agents $Na_2CO_3$, NaOH, and $BaCl_2$, respectively, so that $Ca^{2+}$, $Mg^{2+}$, and $SO_4^{2-}$ ions in the brine generated $CaCO_3$ $Mg(OH)_2$ and $BaSO_4$ precipitates, which were separated out, and introducing the clarified solution having undergone membrane filtration into second brine refining. The main processing equipment thereof was a chelate resin tower, and a three-tower-type flow was adopted. The operation and regeneration treatments of the tower and periodic switching program control thereof were realized by a procedure controller PLC. The refined brine was pumped into a high-level tank, heated to 65-85° C. and then injected into an electrolytic cell. The refined brine was electrolyzed under the action of direct current, with a voltage of 5 V~15 V, to produce chlorine, hydrogen, and sodium hydroxide.

Example 2

The difference from Example 1 is that the raw material crude sodium sulfate was derived from by-product anhydrous sodium sulfate recovered from waste water for the production of ternary precursor $Ni_xCo_yMn_{(1-x-y)}$ from nickel sulfate, manganese sulfate, and cobalt sulfate, containing 95% of sodium sulfate, 3.5% of sodium chloride, and 1.5% of water therein.

Other steps were the same as those in Example 1.

In the above, in the calcination and reduction step, 244.3 g of sodium sulfide solution was obtained, and according to analysis, the sodium sulfide content was 20.0%, the sodium chloride content was 1.2%, and the sodium sulfide yield was 93.64%.

In the sodium sulfide chlorination step, the filtrate was crude sodium chloride solution, and had a weight of 239 g, the sodium chloride content was 25.56%, and 0.35% of sodium sulfate was contained. The sodium chloride yield was 97.90%, 15.7 g of sulfur was obtained, with a content of 99.5%, and the sulfur yield was 95.12%.

Example 3

The difference from Example 1 lies in that, 1, the raw material crude sodium sulfate was by-product sodium sulfate recovered from waste water of vanadium smelting, containing 68% of sodium sulfate, 20.2% of ammonium sulfate, 0.8% of ammonium chloride, and 9% of water therein; 2, 18 g of sodium carbonate was introduced into the raw materials, for converting ammonium sulfate and ammonium chloride in the crude sodium sulfate into ammonia gas, and the ammonia gas entered a tail gas system to recover ammonia water; and 3, 22 g of white coal was taken.

Other steps were the same as those in Example 1.

In the above, in the calcination and reduction step, 229.3 g of sodium sulfide solution was obtained, and according to analysis, the sodium sulfide content was 20.5%, and the sodium sulfide yield was 95.33%.

In the sodium sulfide chlorination step, the filtrate was crude sodium chloride solution, and had a weight of 251 g, the sodium chloride content was 24.46%, and 0.18% of sodium sulfate was contained. The sodium chloride yield was 98.39%. 16.31 g of sulfur was obtained, with the content of 99.1%, and the sulfur yield was 96.1%.

Results of the examples are as shown in Table 1 and Table 2.

TABLE 1

Raw Material Sources and Main Quality Indexes

| Serial No. | Crude sodium sulfate source | Ingredient (%) | | | | |
|---|---|---|---|---|---|---|
| | | Sodium sulfate | Ammonium sulfate | Sodium chloride | Ammonium chloride | Water |
| Example 1 | By-product in chemical fiber industry | 95 | / | 1.5 | / | 3 |
| Example 2 | By-product from ternary precursor | 95 | / | 3.5 | / | 1.5 |
| Example 3 | By-product from wet-method vanadium extraction | 68 | 20.2 | 0.9 | / | 9 |

TABLE 2

Yield and Main Quality Indexes of Product Crude Sodium Chloride Solution and Sulfur

| Serial No. | Sodium chloride solution | | | | Sulfur | | |
|---|---|---|---|---|---|---|---|
| | Concentration % | Calcium-magnesium (by magnesium) % | Sulfate ion % | Overall recovery rate % | Content % | Ash content % | Overall recovery rate % |
| Example 1 | 25.23 | 0.15 | 0.23 | 91.92 | 99.3 | 0.23 | 88.11 |
| Example 2 | 25.56 | 0.18 | 0.35 | 91.67 | 99.5 | 0.16 | 89.05 |
| Example 3 | 24.46 | 0.12 | 0.18 | 93.80 | 99.1 | 0.25 | 91.61 |
| Sodium chloride industrial salt | — | 0.6 | 0.9 | — | 99 | 0.2 | — |

Note:
the "overall recovery rate" is the product of recovery rates of two steps S100 and S200.

In the above, the sodium chloride industrial salt is a sodium chloride industrial salt complying with the national standard GB/T5462-2015.

The above results show that 1. the raw materials used in the examples of the present disclosure are derived from the chemical fiber, ternary precursor, and hydrometallurgical industries. Although other salt impurities contained in the crude sodium sulfate are different, a qualified sodium chloride solution can be prepared, and the sulfur prepared substantially meets the quality requirements for qualified products. 2. Various quality indexes of the prepared sodium chloride solution are better than the standard of industrial salt, which completely meets the requirements for preparing caustic soda by ion exchange membrane method. The sodium chloride solution prepared in the present disclosure completely can be used as a raw material for preparing the caustic soda by the ion exchange membrane, that is, can be used for electrolyzing saline water by the ion exchange membrane method to prepare caustic soda.

In the above technical solutions of the present disclosure, the above is merely for optional examples of the present disclosure, and hence is not intended to limit the patent scope of the present disclosure. Any equivalent structural variations made from the contents of the description and accompanying drawing of the present disclosure or any direct/indirect applications in other related technical fields under the technical concept of the present disclosure is included in the patent scope of the present disclosure as claimed.

What is claimed is:

1. A resource utilization method of crude sodium sulfate, comprising steps of:

reducing the crude sodium sulfate to form a sodium sulfide solution;

making the sodium sulfide solution perform a first reaction with chlorine to obtain sulfur and a sodium chloride solution;

electrolyzing the sodium chloride solution to obtain a sodium hydroxide solution and chlorine, and supplying a generated chlorine to the sodium sulfide solution to perform the first reaction, wherein the step of reducing the crude sodium sulfate to form a sodium sulfide solution comprises:

mixing the crude sodium sulfate and pulverized coal according to a weight ratio of 100:21~23, calcining and reducing a mixture at 800~1100° C., cooling reactant crude base melt to 700° C., crushing and then hot-dissolving the reactant crude base melt with an alkaline solution at 75~80° C. into a liquid, making the liquid stand and filtering the liquid to obtain the sodium sulfide solution.

2. The resource utilization method of crude sodium sulfate according to claim 1, wherein the alkaline solution is a solution containing $Na_2S$, a concentration of the alkaline solution is 3%-5%, and a temperature of the alkaline solution is normal temperature to 50° C.

3. The resource utilization method of crude sodium sulfate according to claim 1, wherein the pulverized coal is smokeless coal, with a fixed carbon content more than 70%.

4. The resource utilization method of crude sodium sulfate according to claim 1, wherein in the step of making the sodium sulfide solution perform a first reaction with chlorine to obtain sulfur and a sodium chloride solution, a concentration of the sodium sulfide solution is 15%~23%, a flow rate of the chlorine is 7 $m^3$/min~11 $m^3$/min, and the sulfur and the sodium chloride solution obtained from the first reaction are separated.

5. The resource utilization method of crude sodium sulfate according to claim 1, further comprising: oxidizing the sulfur to produce sulfuric acid.

6. The resource utilization method of crude sodium sulfate according to claim 5, wherein the step of oxidizing the sulfur to produce sulfuric acid comprises:

melting the sulfur, and burning a molten sulfur under a condition of a pressure of 3.5~4.5 MPa and a temperature of 800~1000° C. to generate smoke; and compressing the smoke, cooling the smoke to 140~150° C., adjusting a pressure to 7.3~8.6 MPa, and making the smoke react with water to obtain the sulfuric acid.

* * * * *